United States Patent

Iwashige et al.

[11] Patent Number: 5,176,822
[45] Date of Patent: Jan. 5, 1993

[54] FLOTATION MACHINE FOR DEINKING

[75] Inventors: Naoyuki Iwashige; Masakazu Eguchi, both of Tokyo, Japan

[73] Assignee: Ishikawajima-Harima Jukogyo Kabushiki Kaisha, Tokyo, Japan

[21] Appl. No.: 804,422

[22] Filed: Dec. 10, 1991

Related U.S. Application Data

[62] Division of Ser. No. 578,753, Sep. 4, 1990, Pat. No. 5,108,586.

[30] Foreign Application Priority Data

Oct. 16, 1989 [JP] Japan .................... 1-266210

[51] Int. Cl.⁵ ................ B03D 1/24; B03D 1/20; B03D 1/14
[52] U.S. Cl. ................ 209/168; 209/169; 209/170; 210/219; 210/221.1; 210/221.2; 162/4; 162/55; 261/93; 261/123
[58] Field of Search ............ 209/169, 170, 168; 210/219, 220, 221.1, 221.2; 162/4, 55; 261/122, 123, 124, 93

[56] References Cited

U.S. PATENT DOCUMENTS

| | | | |
|---|---|---|---|
| 1,322,909 | 11/1919 | Kraut | 209/169 |
| 1,608,896 | 11/1926 | MacIntosh | 209/170 |
| 1,713,046 | 5/1929 | MacIntosh | 209/169 |
| 1,744,785 | 1/1930 | McTaggart | 209/169 |
| 1,798,452 | 3/1981 | Butchart | 209/169 |
| 1,988,351 | 1/1935 | Fairchild | 209/169 |
| 4,247,391 | 1/1981 | Lloyd | 209/169 |
| 4,324,652 | 4/1982 | Hack | 209/170 |
| 4,663,046 | 5/1987 | Feldkirchner | 210/629 |
| 4,749,473 | 6/1988 | Shioiri | 209/170 |
| 5,108,586 | 4/1992 | Iwashige | 162/55 |

FOREIGN PATENT DOCUMENTS

| | | | |
|---|---|---|---|
| 2727088 | 1/1978 | Fed. Rep. of Germany | 261/93 |
| 411908 | 5/1974 | U.S.S.R. | 209/170 |

Primary Examiner—Wilbur Bascomb, Jr.
Assistant Examiner—Thomas M. Lithgow

[57] ABSTRACT

A stock liquid is made to flow into a cell through a stock inlet at one end of the cell. The stock liquid is admixed with air bubbles from an air bubble generating device disposed at a lower portion of the cell and extending between the opposite end plates of the cell, thereby forming the stock liquid into a spiral flow. Ink particles are entrapped by the air bubbles to deink the stock liquid and the air bubbles remain as froth over the free surface of the stock liquid. The froth is made to flow down to the froth trough. The deinked stock liquid is discharged to the exterior of the cell through the stock outlet at the other end of the cell.

3 Claims, 17 Drawing Sheets

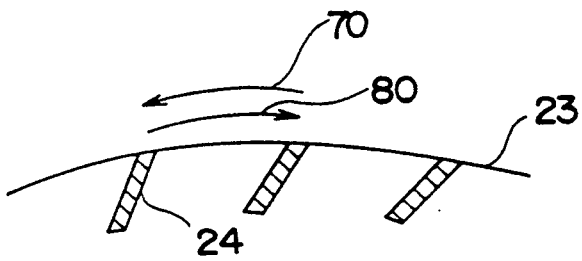
Fig.22(a)
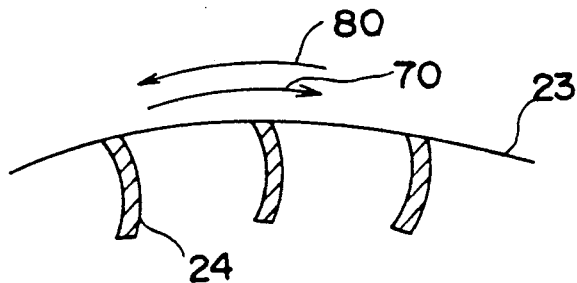
Fig.22(b)
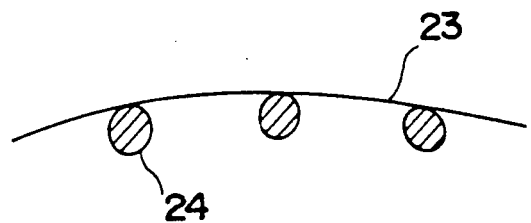
Fig.22(c)
Fig.23
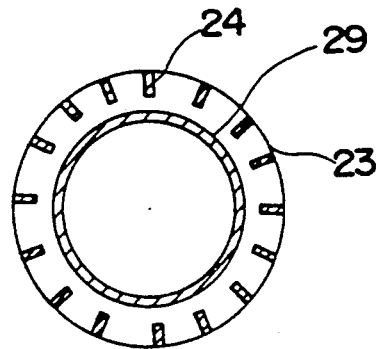

FLOTATION MACHINE FOR DEINKING

This is a division of application Ser. No. 07/578,753, filed Sept. 4, 1990 (now U.S. Pat. No. 5,108,586).

BACKGROUND OF THE INVENTION

The present invention relates to a flotation machine for deinking in which ink and oil pitch contained in waste papers are attached to bubbles, said flotation machine being used in a waste-paper recovery installation for defiberizing and cleaning waste papers into papermaking materials.

Deinking methods for waste papers are in general divided into flotation method, washing method and combination thereof.

In the flotation method, air is admixed to waste-paper stock liquid, which has been obtained by defibering waste papers and adding chemical agents to them, and free ink particles are adsorbed by air bubbles generated. After the air bubbles having the ink particles entrained therein float up to the surface of the liquid, the ink particles are separated and removed. On the other hand, in the washing method, a large quantity of water is forced to flow thereby to remove free ink particles.

From the viewpoint of obtaining satisfactory results in the washing method and suppressing lowering of the yield and increase of load in a effluent water system, combination of flotation method with washing method has been mostly used. If the flotation method is strengthened, the washing method may be eliminated or minimized.

In the flotation method, free ink particles in the waste-paper stock liquid are adsorbed to the bubbles and float, whereby the ink particles are separated and removed from the liquid. The smaller the diameters of the bubbles are, the more readily the fine ink particles are adsorbed to them. It is therefore important for efficiently carrying out the flotation method that the total surface of the bubbles is large; the bubbles are uniformly distributed in the waste-paper stock liquid; and residence time during which the bubbles are remaining in the stock liquid is longer. When the same quantity of air is admixed to the stock liquid, the finer the bubbles are, the larger the total surface of the bubbles becomes and the slower the flotation speed of the bubbles becomes. The processing by the flotation method is therefore evaluated by how to uniformly admix a larger quantity of fine air bubbles to the stock liquid and how to effectively remove them as froth from the liquid.

Formerly, printing ink was weak in adhesion to paper fibers and was relatively readily separatable. Demand in quality for deinked pulp was not so high. As a result, former flotation machines could attain satisfactory results by a relatively small quantity of air and the shorter residence time of bubbles.

Recently, there arise many problems which can be hardly solved by the former deinking technique using the older flotation methods. Firstly, adhesion strength of printing ink has been increased in accordance with developments of printing technique such as use of offset process in printing newspapers so that the mechanical force is required for separating the ink, resulting in separated ink particles being of finer diameters. Secondary, degree of utilization of waste papers has been increased since natural resources have been decreasing globally. Thirdly, demands in quality for paper used in printing have been enhanced because of enhanced demands for visual gorgeousness and coloration of printed papers. Fourthly, strict regulations have been applied to effluent water discharged from papermaking processes.

When the operation of the washing method itself is intensified, effluent water cannot satisfy strict regulations. It is therefore a general acceptance among experts in the art that selection of effective flotation method is a best approach for overcoming the above described problems. Thus, various powerful flotation machines have been devised and demonstrated.

A recent trend in flotation method is such that cell volume is increased and residence time is prolonged to thereby increase opportunities of contact of bubbles with ink particles. Air bubbles are made finer and are admixed in a large quantity to waste-paper stock liquid to produce and remove a large quantity of froth. Such trend is influenced not only by mechanical improvements but also by improvements of deinking agents (surfactants).

Table 1 shown below illustrates comparison in mechanical performances between a former flotation machine and a recent flotation machine.

TABLE 1

|  | Former machine | Recent machine |
| --- | --- | --- |
| Air volume (G/L)* | 1–3 | 4–8 |
| cell number per 100 pulp tons per day | 6–20 | 3–6 |
| Cell capacity ($m^3$) per 100 pulp tons per day | 70–120 | 150–200 |
| Cell capacity ($m^3$) | 5–20 | 20–50 |
| Primary residence time** (min) | 10–15 | 20–30 |
| Power source unit (kWH per pulp ton) | 20–40 | 40–60 |
| Increment in brightness (Hunter) | 3–4 | 6–10 |

Remarks
*G/L: total air quantity ($Gm^3$/min) per total processing liquid ($Lm^3$/min)
**residence time in primary flotation machine. Primary reject is secondarily processes and secondary accept is returned to primary inlet.

FIG. 1 illustrates an example of former type vertical cylindrical cell flotation machines in which reference character a denotes an air inlet; b, a stock inlet; c, a stock outlet; d, a cell; e, an air port for pushing out froth; f, a froth fan; and g, a froth outlet. As shown, two cells substantially identical in construction are stacked. Air is admixed to the stock liquid by means of an ejector effect at the stock liquid inlet. The liquid is made to tangentially flow into the cell and swirls around the axis of the cell with the air admixed to the liquid. In the cell, the air floats up as bubbles to form froth. The stock liquid is discharged from the vicinity of the axis of the cell via the outlets c. Froth is forced to flow into an opening (not shown) at the froth outlet g by the air blown from the port e on the side wall of the cell near the liquid level and then is discharged through the outlet g to the exterior. The froth pushing air is forced to cycle by the froth fan f.

In the flotation machine of this type, the quantity of air sucked cannot be increased since the air is sucked by means of the ejector effect. Even if the air is compressedly admixed, the result is merely that larger-diameter ineffective bubbles are increased in quantity. In addition, it is difficult to optimumly control the velocity of the swirling liquid; if the velocity of the liquid is too low, stock rejects may be increased; if the swirling velocity is excessive, the fine air bubbles, which has less floating force, may fail to cross the swirling flow to float up, disadvantageously resulting in unsatisfactory separation of the froth from the stock flow:

FIG. 2 illustrates, as another example of the former type machines, a box cell flotation machine in which reference numeral h denotes an air inlet; i, a stock inlet; j, a box type cell; k, a disc-shaped impeller having a plurality of blades; m, a stock outlet; and n, a froth outlet. The flotation machine of this type is generally called "Denver" type. The stock liquid is introduced to the center of the impeller k while the air is sucked by itself. The liquid admixed with the air is diffused along the bottom surface of the cell due to the centrifugal force of the impeller k and rises along the side surfaces of the cell. At the liquid level, the air bubbles are separated as froth from the stock liquid. The liquid separated flows down along the center portion and circulates. Part of the liquid is discharged through the outlet m while the froth is discharged through the outlet n.

In such box cell flotation machine, the impeller k must be rotated fast so as to produce fine air bubbles; but if its speed is too fast, the circulation of the liquid in the cell may become too violent, disadvantageously resulting in the floating froth swirled back into the stock liquid.

The flotation machines of the types described above are defective in that the air for producing fine air bubbles cannot be increased in quantity because of the machines being of self air suction type. Even if the air were forcibly introduced into the machine, only the quantity of ineffective air would be increased and satisfactory result could not be attained. Furthermore, because of insufficient mixture and separation of the air-liquid, cells must be stacked in stages in series, resulting in complicated installation.

By contrast, in recently developed flotation machines, high rotational speed of the rotor causes air bubbles to receive strong shearing forces to be converted in a larger quantity into fine air bubbles, which are admixed to the stock liquid. Agitating action is intensified to satisfactorily diffuse air bubbles in the liquid and to increase the residence time of air bubbles in the liquid to thereby increase opportunities of the ink particles being made contact with the liquid. The cell is of large capacity to afford a sufficient period of time permitting floating and gathering of air bubbles. These are the features of the recently developed flotation machines.

FIGS. 3 and 4 illustrates a rotary diffusion type flotation machine as an example of the most recently developed machines (Japanese Patent 1st Publication No. 245390/1986) in which reference numeral 51 denotes a vertical cylinder type cell; 52, 53 and 54, weirs; 56, rotary diffusion pipes; 57, a rotating shaft; 58, an air supply inlet; 59, a liquid level; 60, a stock supply inlet; 61, a stock outlet; 62, a rotary type froth collection blade; and 63, a froth trough.

The stock liquid flows through the inlet 60 into the cell 51 and repeatedly flows up and down in a zigzag manner between the weirs 52, 53 and 54 and then is discharged through the outlet 61. The air flows through the inlet 58 into the diffusion pipe 56 rotating at a high rotational speed and flows into the stock liquid through vent holes 20-40 mm in diameter opened through small projections 64 on the pipe 56. Because of difference in velocity between the liquid and the surface of the diffusion pipe 56, the air receives strong shearing forces to become fine air bubbles, which are diffused into the liquid. The stock liquid is violently agitated by the rotating force. The air bubbles in the liquid float up to the liquid level 56 to form froth, which is collected by the scraping blade 62 into the trough 63 and discharged to the exterior. The discharged froth may be secondarily processed as needs demand.

In the flotation machine of this rotary type, in order to produce fine air bubbles and agitate the liquid in the vessel having a large capacity, the large-diameter diffusion pipe 56 must be rotated at a high rotational speed so that powerful driving force is required. The stock liquid repeatedly flows up and down between the weirs 52, 53 and 54 and the bubbles in the downward flow are difficult to rise up, adversely affecting the separation of the bubble from the liquid; as a result, production of froth over the liquid level varies between the liquid surface portions where the upward flowing liquid appears and those where the liquid flow downwardly. Since the air is injected into the liquid from interiors of the diffusion pipes 56, the liquid-tight sealing 65 between the pipe and the wall of the cell is complicated and its maintenance is difficult. When the flotation machine is started or stopped or the balance between the air pressure and the liquid pressure is lost, the stock liquid may flow into the diffusion pipe 56 and adhere to the interior wall thereof due to the centrifugal force, thereby clogging the air vents on the wall of the pipe 56. Agitated flows produced by the diffusion pipe 56 are unstable so that when variations in concentration or the like of the liquid occur, the flow rates of the stock liquid may vary and the air bubbles may suddenly burst.

The present invention was made in view of the above-described problems of the former or most recent machines and was based on the following concept and the results of the experiments conducted by the inventors.

When a certain volume of air is admixed to a liquid, the total surface area of bubbles is substantially in inverse proportion to mean diameters of the bubbles so that the smaller the mean diameter of the bubbles is, the larger the total surface area becomes. Velocity of air bubbles flowing upwardly is substantially in proportion to mean diameter of the bubbles so that the residence time of the bubbles in the liquid is substantially in inverse proportion to the mean diameter of the bubbles when the depth of the liquid remains constant. It follows therefore that the opportunities of the air bubbles being made into contact with the ink particles to adsorb and entrap them is substantially in inverse proportion to the square of the mean diameter of the bubbles so that the less the diameters of the bubbles are, the more remarkably the above-described opportunities increased.

According to experimental results, it is noted that the larger the volume of air is admixed and the larger the volume of the froth discharged is, the better the brightness is improved. FIG. 5 illustrates the relationship between the brightness (Hunter) of the accept stock and the flow-rate reject rate, obtained by processing the waste-paper stock consisting of 100% offset-printed newspaper. It is noted that even when the flow-rate reject rate is increased in excess of 20%, the brightness is not substantially increased accordingly so that the flow-rate reject rate on the order of 15-20% is preferable (in this case, the fiber stock in the reject is lower in concentration than that at the stock inlet and stock reject rate is on the order of approx. 5%).

The present invention was made based on the above-mentioned problems encountered in the conventional flotation machines, conceptions of the inventors and results of the experiments conducted by the inventors and has the following aims:

(1) Fine air bubbles are uniformly admixed to the stock liquid, thereby eliminating the necessity of blowing an excessive volume of air into the liquid and thus reducing required power for blowing the air thereto.

(2) The air bubbles are uniformly admixed to the stock liquid by a less degree of agitating power.

(3) Turbulence and dead zones in the flow passages in the cell are eliminated to decrease cell capacity for a volume of stock liquid to be processed as well as variation in brightness in the accept.

(4) The opportunities of the air bubbles being mixed with and separated from the stock liquid are repeatedly given to thereby shorten the processing time and consequently decrease the cell capacity for a volume of stock liquid to be processed.

(5) Disturbance on the liquid level and variation in generated froth are eliminated to smoothly remove the froth without being swirled back into the liquid.

(6) Finer air bubbles are produced to remove finer ink particles and to increase the opportunities of trapping the ink particles. And, (7) the air bubble generating means or device is made simple in construction and in maintenance and is reliable in operation.

To attain the above-described aims, the flotation machine for deinking in accordance with the present invention comprises a horizontally extending cylindrical cell having opposite end plates to define a reservoir for a stock liquid with a free surface at its top, a froth trough on a upper portion of said cell for receiving froth floating up to said free surface of the liquid and for discharging the froth to an exterior, a stock inlet at one end of said cell for supplying a stock liquid, a stock outlet at the other end of said cell for discharging the stock liquid, at least an air bubble generating means at a lower portion of said cell and horizontally extending between said end plates, whereby said stock liquid admixed with air bubbles from said air bubble generating means biasedly flowing in the whole interior of said cell from the stock inlet to the stock outlet in the form of a spiral with a horizontal axis, said air bubble generating means comprising a turbine rotor adapted to be rotated at a high rotational speed and having an air supply pipe disposed above and adjacent to said turbine rotor along a generating line of the rotor and having at least an air port opened toward said turbine rotor.

In the flotation machine for deinking in accordance with the present invention, the stock liquid flows into the cell at one end thereof and is sucked into the air bubbles generating means or device where it is mixed with the air bubbles and is forced to flow not circumferentially uniformly but biasedly out of the air bubble generating means. The stock liquid admixed with the air bubbles rises within the cell along the spiral flow path.

The bubbles reach the free surface of the liquid together with the liquid flow and then separate from the liquid, remaining as froth over the free liquid surface. The froth overflows into the trough and flows out to the exterior.

The liquid now free from the bubbles flows down in the cell through the downward flow path oppositely of the rising liquid path and passes again through the air bubble generating means where the liquid again entrains air bubbles. Thus, the stock liquid repeatedly flowing up and down and finally flows through the stock outlet to the exterior of the cell.

The air bubble generating means or device will generate fine air bubbles according to the mechanism shown in FIG. 10. More specifically, the air from an air port of an air supply pipe above the rotor joins in the liquid circulating around each turbine blade moving at a high speed and then is entrapped in a negative zone on the rear side of the blade and flowing into the rotor. On the other hand, the stock liquid circulating in the vicinity of and in unisom with the turbine rotor strikes on the air supply pipe and is suddenly decelerated to be increased in pressure so that part of the stock liquid flows into the turbine rotor, which also causes air to flow into the turbine rotor together with the part of the liquid. Air and stock liquid flowing into the turbine rotor receive the shearing forces by the inner edges of the blades and are mixed together. The liquid then flows out of the turbine rotor due to the centrifugal force so that the air bubbles entrained in the liquid are subjected to the shearing forces by the outer edges of the blades to become finer and be uniformly distributed in the stock liquid.

Most of the stock liquid circulating in the vicinity of and in unison with the turbine rotor moves away from the rotor into the rising flow, which facilitates formation of the spiral flow path in the cell.

The present invention will become more apparent from the following description of preferred embodiments thereof taken in conjunction with the accompanying drawings.

BRIEF DESCRIPTION OF THE DRAWINGS

FIGS. 22(a), 22(b) and 22(c) are sectional views showing modifications of a turbine blade on a turbine rotor of the flotation machine in accordance with the present invention:

FIG. 23 is a sectional view of a modification of the air bubble generating means of the flotation machine, in accordance with the present invention.

DETAILED DESCRIPTION OF PREFERRED EMBODIMENTS

Figure 1:
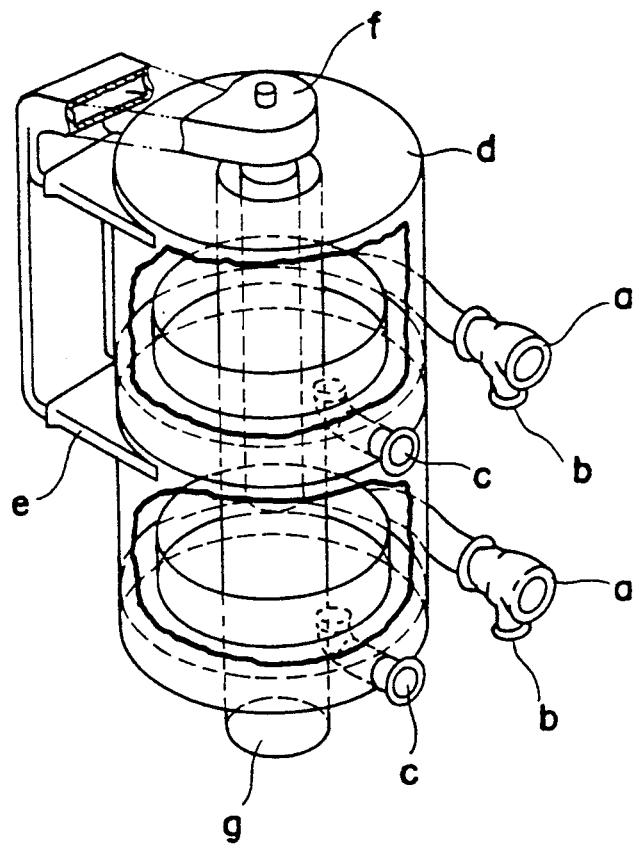
FIG. 1 is a perspective view of a former type flotation machine.

Referring now to FIGS. 6-10, a preferred embodiment of the present invention will be described in which reference numeral 1 represents a stock inlet; 2, a stock outlet; 3, air bubble generating means or device; 4, a trough for trapping froth; 5, a cell comprising a cylindrical barrel 5a and end plates 5b and 5c attached to opposite ends of the barrel 5a; 7, a stock liquid; 8, a free surface of the liquid 7; 9, froth; 10, fine air bubbles; 11, spiral flow path; 21, a turbine rotor; 22, journals; 23, rib; 24, blades; 25, a turbine rotor body; 26, an air supply pipe; and 26a, an air port.

The cell 5 comprises the substantially horizontally disposed and generally cylindrical barrel 5a which is cut off at its upper portion, end plates 5b and 5c attached to the opposite ends of the barrel 5a and frame members 5d which define together with a bottom plate 5f a froth trough 4 which is of a rectangular section and is one-sidely protruded. More specifically, one of the member 5d extends from a upper cut edge 5e at one side of the barrel 5a; two of the members 5d vertically extend from the end plates 5b and 5c, are connected to the one member 5d and horizontally extend away from said cut edge 5e; and the remaining member 5d are connected to said two members 5d as well as the bottom plate 5f extending from the barrel 5a, thereby defining the froth trough 4. An overflow plate 5g is formed integral with a further cut edge 5e at the other side of the barrel 5a and extends slantly outwardly so that froth overflows over the plate 5g into the trough 4.

The stock inlet 1 at one end of the bottom of the cell 5 comprises an inlet pipe 1a extending in the axial direction of the barrel 5a and a nozzle 1b which is connected to the inlet pipe 1a and is perpendicular to the pipe 1a and tangential to the barrel 5a. The stock outlet 2 at the other end of the bottom of the cell 5 is substantially similar in construction to the stock inlet 1 and is symmetrical to the inlet 1.

Figure 9:
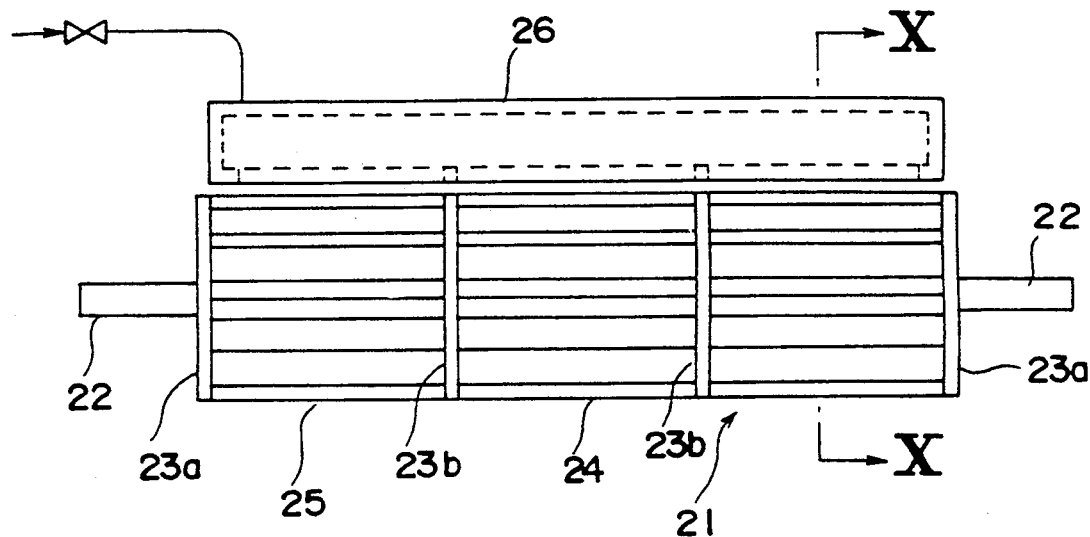
FIG. 9 is a side view of an air bubble generating means or device of a flotation machine in accordance with the present invention.
Figure 10:
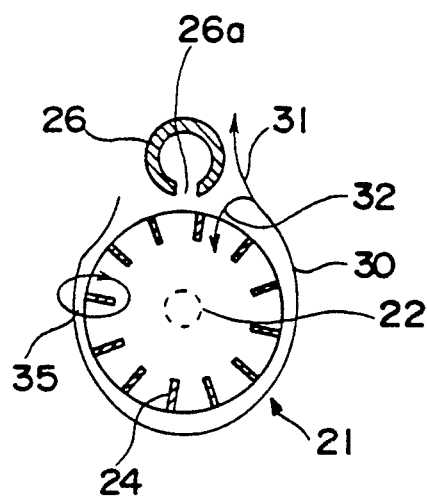
FIG. 10 is a sectional view taken along the line X—X of FIG. 9.

The air bubble generating means or device 3 extends between the end plates 5b and 5c at the lower portion of the cell 5. As shown in FIGS. 9 and 10, the generating device 3 comprises a turbine rotor 21 and an air supply pipe 26 disposed above and adjacent to the rotor 21. The rotor 21 comprises a rotor body 25 in the form of a cylindrical cage and journals 22 extending outwardly from opposite ends of the body 25. More specifically, the rotor body 25 is constructed by disposing a plurality (four in the embodiment) of disc-shaped ribs 23a and 23b having the same diameter coaxially and in parallel with each other in equally spaced-apart relationship, a plurality of blades 24 being securely attached to the outer peripheral surfaces of the ribs 23a and 23b radially and in equiangular relationship. The journals 22 extends outwardly from the center of the ribs 23a and 23b at the opposite ends of the rotor body 25. The air supply pipe 26 has at least an air outlet 26a which is opened toward the turbine rotor 21 and which may be in the form of round hole or elongated slit. The journals 22 of the turbine rotor 21 extend outwardly beyond the end plates 5b and 5c and are supported by bearings 3b securely attached to the outer surfaces of the end plates 5b and 5c. A belt pulley 3a is carried by one of the journals 22 and is drivingly coupled to a motor (not shown) so that the pulley 3a is driven at a high rotational speed.

The air bubble generating means 3 is disposed in biased relationship with respect to the axis of the barrel 5a toward the rising path (on the side of right in FIG. 6) of the spiral flow path defined by the stock liquid introduced into the cell 5 from the stock inlet 1.

Next the mode of operation of the flotation machine with the above described construction will be described.

The stock liquid 7 flows into the cell 5 in the axial direction thereof through the inlet pipe 1a of the stock supply inlet 1 and changes its flow direction about by substantially 90 degrees so that it flows toward the one end of the bottom of the cell 5 from the nozzle 1b in the tangential direction. Due to the inertia when the stock liquid is introduced, it flows into and reaches the air bubble generating device 3 where the liquid 7 is mixed with fine air bubbles to have decreased apparent specific gravity and have buoyancy. Due to the combination of the inertia upon introduction into the cell 5 with the buoyancy, the liquid 7 flows upwardly and reaches the free surface 8. The liquid flow 30 moving together with the outer peripheral surface of the turbine rotor 21 strikes on the air supply pipe 26 above the rotor 21 and is divided into upward and downward flows 31 and 32. The upward flow 31 intensifies the above-described rising flow while the downward flow 32 assists introduction of the air from the pipe 26 into the rotor 21.

The stock liquid containing the fine bubbles 10 rises and reaches the free surface 8. It flows over the free surface 8 toward the froth trough 4 while some fine bubbles remain as froth over the free surface 8.

Figure 6:
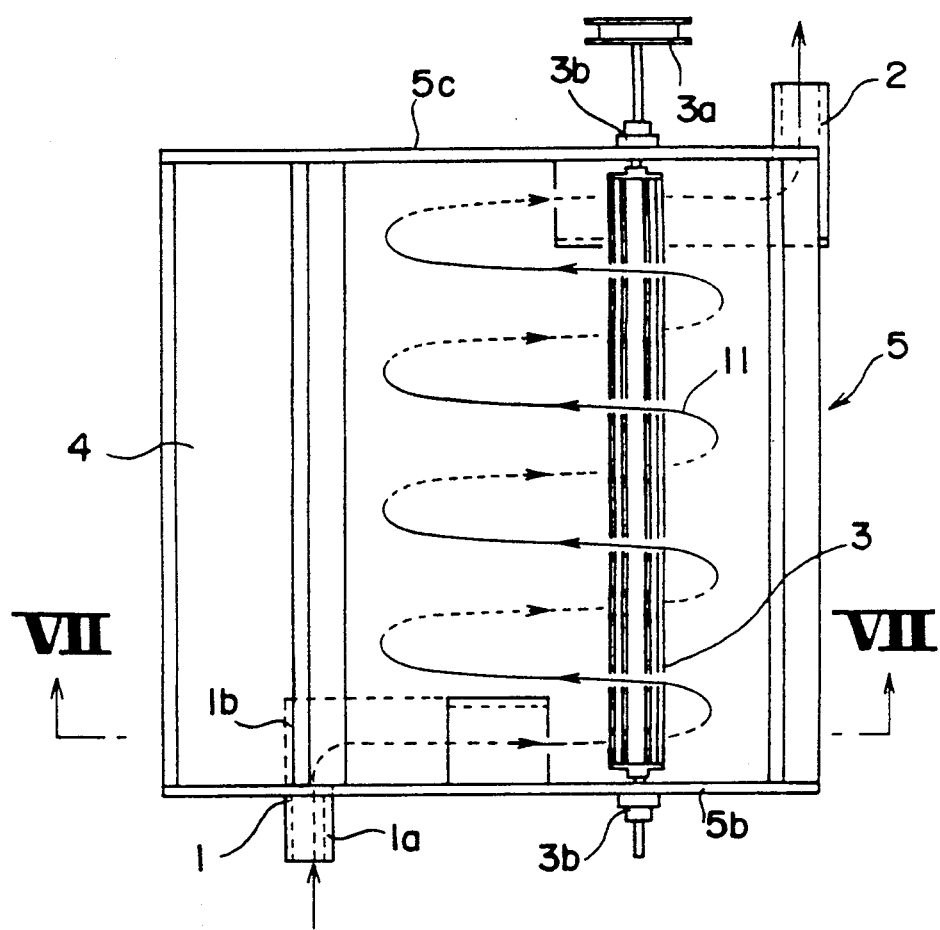
FIG. 6 is a plan view of a preferred embodiment of a flotation machine for deinking in accordance with the present invention.
Figure 7:
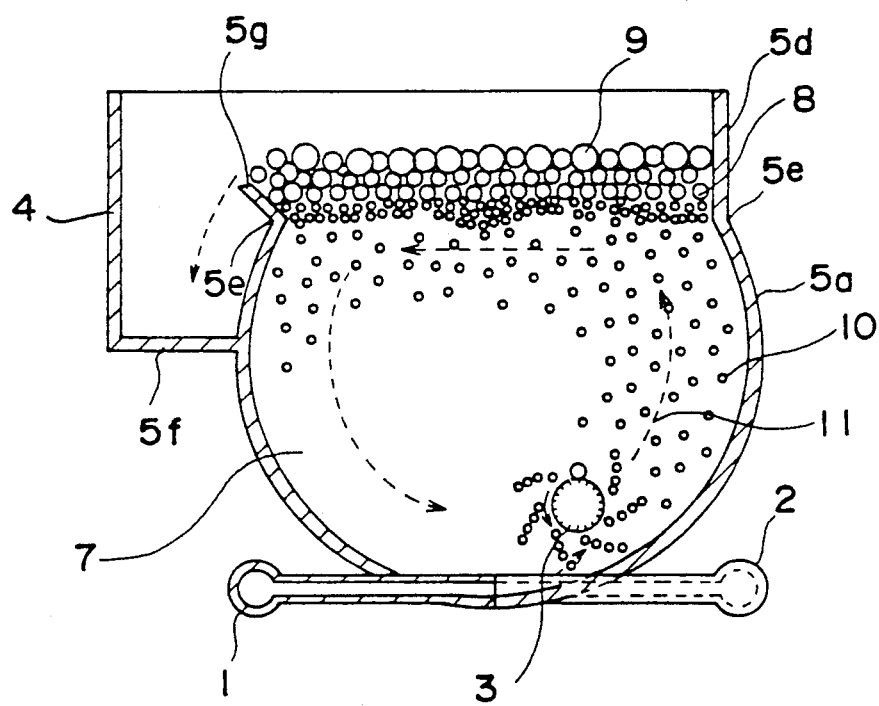
FIG. 7 is a sectional view taken along the line VII—VII of FIG. 6.
Figure 8:
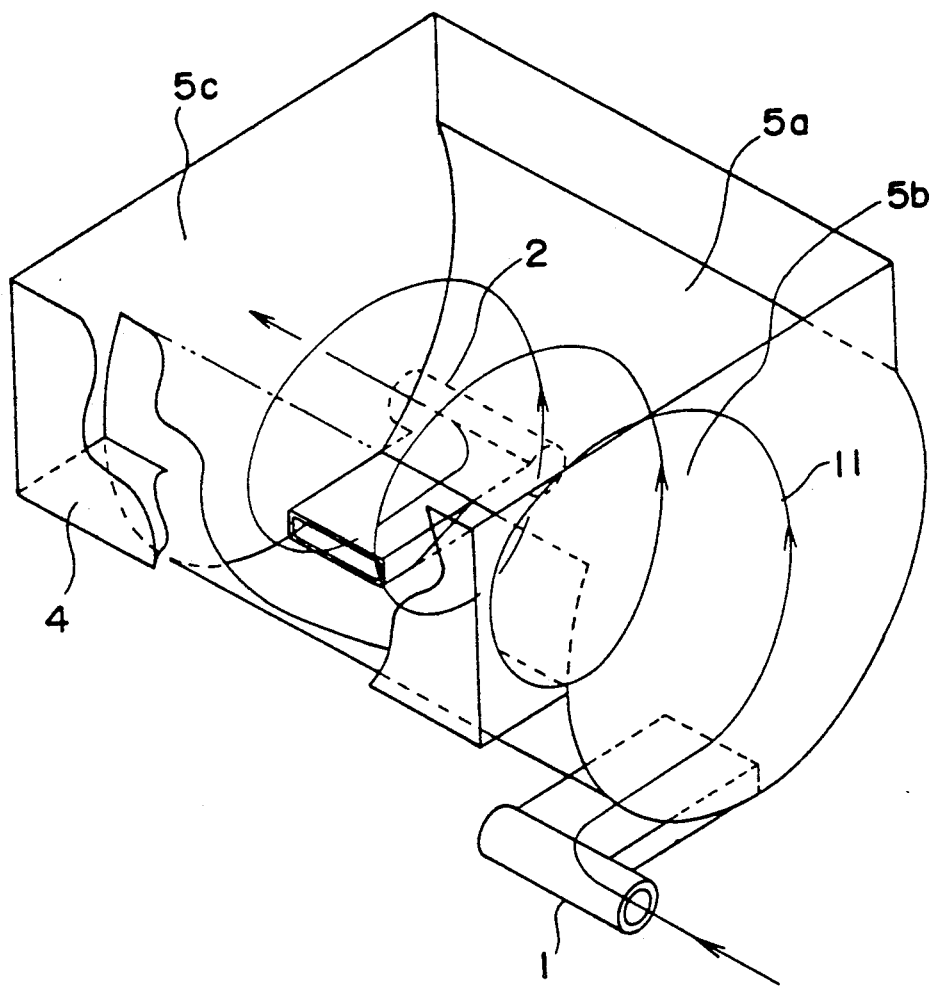
FIG. 8 is a perspective view of a cell of a flotation machine in accordance with the present invention.

The stock liquid now free from the fine air bubbles 10 flows down along the inner surface of the barrel 5a on the side of the forth through 4 and again reaches the air bubble generating device 3. In this way, the stock liquid swirls around the axis of the cell; since the liquid flows continuously into the cell, its phase is sequentially displaced toward the stock outlet 2 so that as shown in FIGS. 6-8, it becomes a spiral flow 11 in the counterclockwise direction and flows out of the cell 5 through the stock outlet 2.

As mentioned previously, the construction of the air bubble generating device 3 is such that the compressed air blows toward the turbine rotor 21 rotating a high rotational speed and as shown in FIG. 10, the circulating flow 35 exists around the blade 24 rotating at a high rotational speed so that the compressed air flows into the rotor 21 from the rear side of the direction of the movement of the blade 24. The stock liquid 7 containing the fine air bubbles is then forced to flow out of the rotor 5 by the centrifugal force and the force causing the circulating flow 35. Twice or when the air flows into and out of the turbine 21, it is subjected to the extremely strong shearing forces and becomes fine air bubbles 10 to be admixed to the stock liquid 7. Because of the air bubble generating device 3 in the spiral flow path 11, the air bubbles 10 are uniformly admixed to the stock liquid, mixture and separation of the air bubbles 10 into and from the liquid 7 being repeatedly carried out. Because of the air bubbles 10 uniformly distributed in the liquid 7 and having a constant rising velocity, the liquid flow remains in the stabilized state. Also due to the shape of the cell, no turbulence of the liquid flow path, no disturbance of the free surface and no variation of the distribution of the froth will occur. As a result, a stabilized bed of froth 9 is formed over the free surface 8 and no re-entrainment of the bed of the froth 9 by the liquid 7 will occur. The froth bed over the free surface 8 is forced toward the trough 4 due to the spiral flow of the stock liquid 7 and overflows over the overflow plate 5g into the trough 4 from which the froth is discharged to the exterior and, if necessary, is subjected to a secondary process. The secondarily processed accept is returned to the stock inlet 1.

It is said that diameter of ink particles removable from a liquid by a flotation process for deinking be 10 $\mu$m or more and that optimum diameter ranges of ink particles be 10–15 $\mu$m. It is also said that diameter of ink particles, which are solids comprising carbon particles bound by resin binder, adsorbable by air bubble 1 mm in diameter is on the order of 13 $\mu$m. It follows therefore that the smaller the diameter of air bubbles are, the less-diametered ink particles can be adsorbed. In the field of newspaper printing, offset printing with more beautiful letters printed are driving out relief printing. The carbon particles contained in the ink for the offset printing are very fine (on the order of 0.01 $\mu$m) and cannot be readily removed from fibers after printing. In order to overcome this problem, prevailing in recently developed deinking plants is a deinking method that a stock is condensed to a very high degree and fibers are subjected to mechanical shearing forces, thereby removing the attached ink particles. The shearing forces, of course, make the free ink particles more finer so that the diameter of the ink particles to be removed by the flotation method becomes finer and finer.

As compared with the conventional air bubble generating devices, the air bubble generating device according to the present invention will generate by far finer air bubbles, which is most preferable. Because of much difficulties in measurement of the diameter of an air bubble generated, volume of air dissolved in liquid is used as parameters indicating diameter and volume of air bubbles contained since the smaller the diameter of generated bubble, the slower the floating velocity becomes and therefore the larger the volume of air remaining in a liquid becomes. The volume of dissolved air can be measured in terms of the rise of the liquid level.

$$\text{Dissolved air volume } (\%) = \frac{\text{Increment}}{\text{Initial liquid volume + increment}} \times 100$$

In the former type flotation machine (for example as shown in FIG. 1), the dissolved air volume is 2–10%; but according to the present invention, the dissolved air volume may be increased up to 20–25%. The higher the rotational speed of the turbine, the larger the dissolved air volume becomes.

Figure 11:
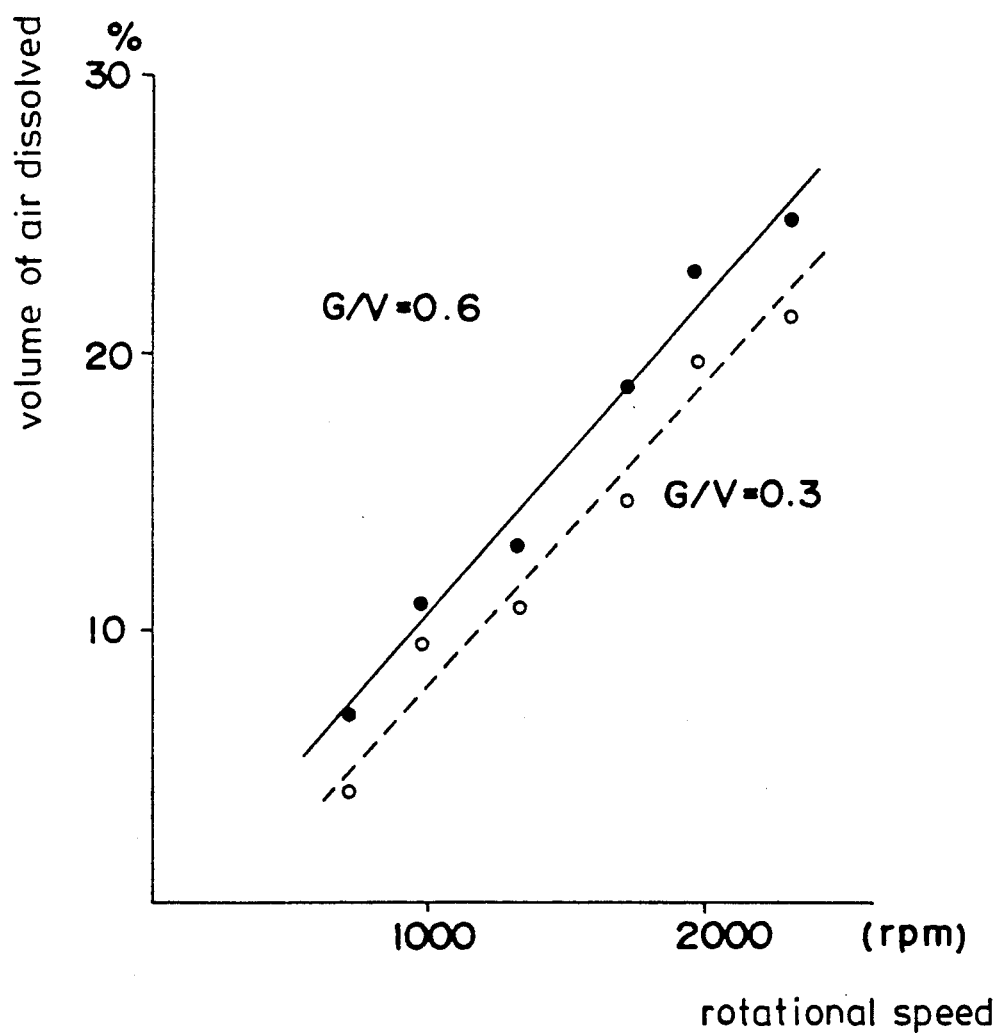
FIG. 11 is a graph illustrating the relationship between rotational speed of rotor and volume of air dissolved.

The graph shown in FIG. 11 illustrates the dissolved air volume when G/V=0.6 and 0.3 respectively where
G: Air volume fed by blower m$^3$/min;
V: the volume of the cell m$^3$;
Experimental condition: Waste newspapers were used as stock and the concentration was 1% with deinking agent added thereto.

It is noted that even when the air volume is increased, the dissolved air volume does not substantially increase accordingly; but the higher the rotational speed, the more the dissolved air volume increases. In other words, it is possible to change the diameter of air bubble by changing the rotational speed.

Next the construction and the mode of operation of the air bubble generating device according to the present invention will be described in comparison with the recently developed rotary type diffusion device most similar to the air bubble generating device of the present invention.

One of the most significant difference in construction between the device in accordance with the present invention and the conventional device resides in that the former has the air supplied from the exterior of the rotor while the latter has the air supplied from the interior of the rotor.

From the standpoint of maintainability, the difference in construction plays an important roll. In the former, the air supply system and the rotor are independent from each other so that the device is simple in construction and is very easy in cleaning and in maintenance while, in the case of the latter, the liquid-tight sealing is very complicated in construction and cleaning in disassembly and the inspection and maintenance are difficult.

The difference in construction of the air bubble generating device in accordance with the present invention from the conventional one resides in that the former has air and liquid introduced into the interior thereof from the exterior of the turbine so that they are mixed in the interior of the device and discharged while the latter has the air which is, upon discharge out of the interior, mixed with the liquid around the peripheral portion of the rotor.

From the standpoint of stabilization of generation of air bubbles, the difference in construction described above has very important influence. In the device of the present invention, unless the volume of the air is exceptionally large, the air and the liquid are introduced into the turbine, mixed with each other and are discharged so that regardless of the air volume and the liquid pressure, the air bubbles generated are stabilized. On the other hand, in the conventional device, when the balance between the air and liquid is lost, no air bubbles can be generated. That is, when the air volume is increased, the rotor is surrounded with the air so that sudden burst of air bubbles may occur; when the air volume becomes less, the liquid may invade into the rotor, causing the clogging of the air vents.

Figure 12:
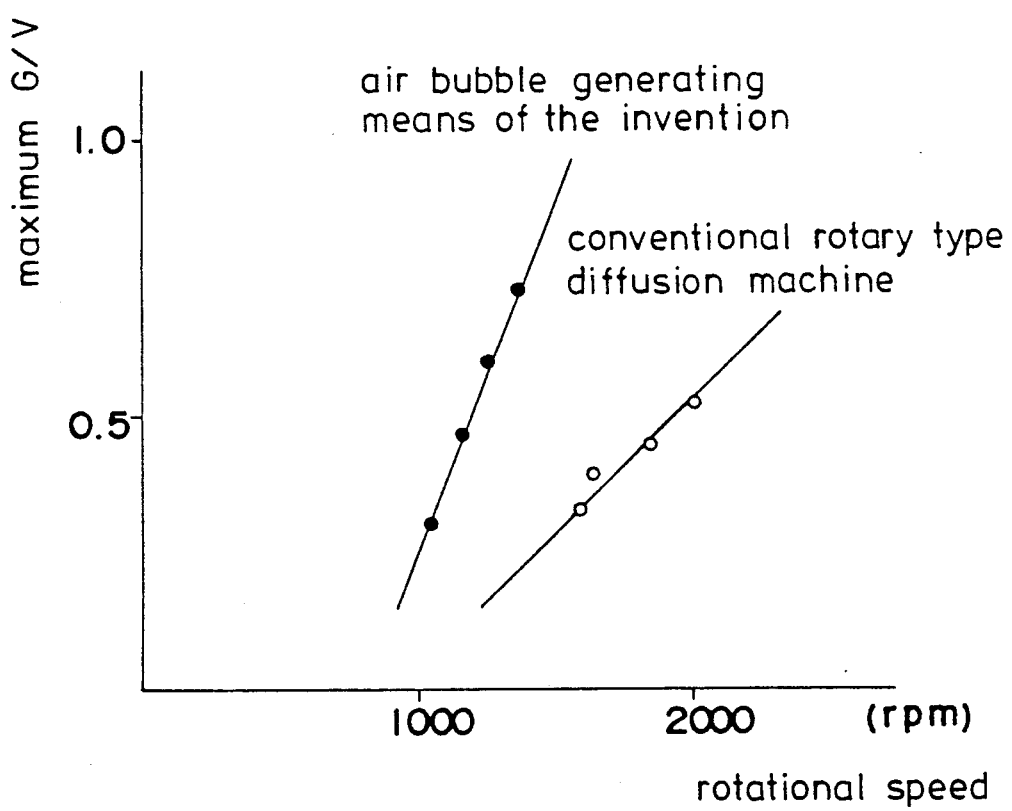
FIG. 12 is a graph illustrating rotational speed of rotor and maximum G/V.

FIG. 12 is a graph illustrating the limit G/V of the air bubble generating device in accordance with the present invention and the above-described rotary type diffusing machine both of which have rotors equal in diameter. In this case, the limit G/V means the maximum air volume which does not cause sudden burst of the air bubbles. It is clear that the limit G/V of the device of the present invention is much high.

The second difference is the difference in size of generated air bubbles. According to the present invention, since the air bubbles are subjected to the shearing forces twice, that is, upon entering to and leaving from the rotor, the air bubbles are made finer. On the other hand, in the conventional device, the air bubbles are subjected only once to the shearing forces when the air flows out of the rotor so that the degree of fineness of air bubbles is low. The dissolved air volume which is as mentioned above a parameter for size of air bubbles generated is, under the same conditions, 24% in the case of the device of the present invention and 12% in the case of the above-described rotary type diffusion device. The experimental conditions were as follows:

G/V=0.25,
Stock : waste newspapers,
Consistency : 0.8%, and
Rotor peripheral velocity : 600 m/min.

In the above-described conventional rotary type diffusion machine, a major part of the rotating force is used for agitation so as to uniformly distribute the air bubbles in the cell.

The air bubble generating device in accordance with the present invention is biased toward the rising liquid flow in the cell so that the rising stream with the air bubbles helps the spiral upward flow of the liquid. The liquid flow caused by the turbine rotor 21 and moving in unison with the latter strikes on the air supply pipe 26 so that part of the liquid becomes the upward flow and consequently the spiral flow is further intensified. The spiral liquid path is stabilized and the air bubbles are entrained by the spiral liquid flow and distributed uniformly in the cell so that the diameter of the turbine rotor 21 can be made minimum as far as a suitable volume of air can be entered in the liquid. The power required for agitation becomes less so that the overall power consumption becomes also less.

Figure 13:
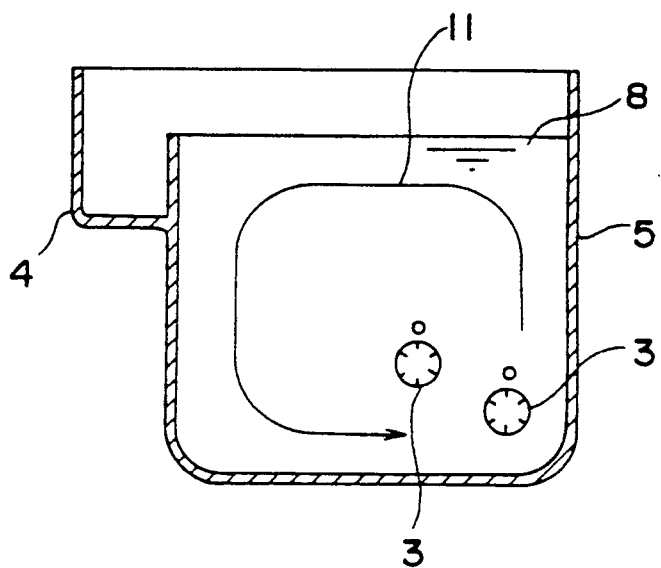
FIGS. 13–18 are sectional views of modifications of a flotation machine for deinking in accordance with the present invention.

FIG. 13 shows in a sectional view a first modification of the flotation machine for deinking in accordance with the present invention in which the cell has rectangular cross section and edges of the bottom are filleted in the form of arc.

The cell having an angular cross section may have slower spiral liquid flow as compared with the cylindrical cell; but it has advantages of easier fabrication and smallness as compared with its volume. A pair of air bubble generating devices are disposed biasedly toward one side of the cell, which is more preferable than only one large-sized air generating device since air bubbles are distributed more uniformly into the whole volume of the stock liquid within the cell.

Figure 14:
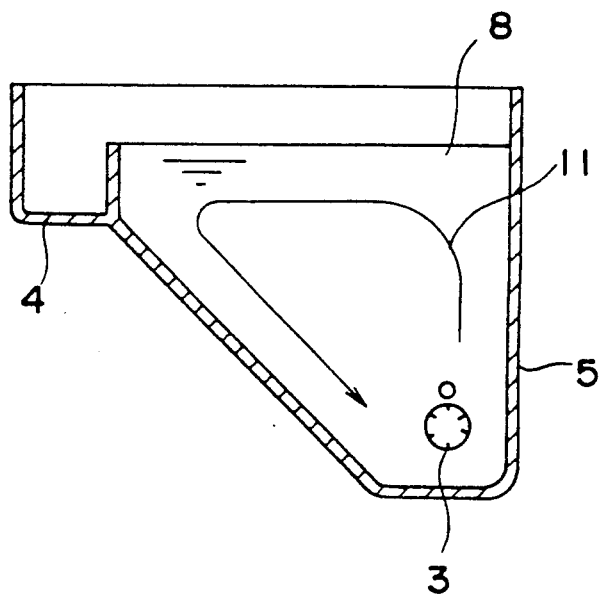

FIG. 14 illustrates another modification of the flotation machine in accordance with the present invention in which some edges are filleted in the form of straight line and greater than the remaining bottom edges so that the cell has a generally triangular cross section. Such construction will eliminate dead zones which may otherwise be formed on the side opposite to the air bubble generating device.

Figure 15:
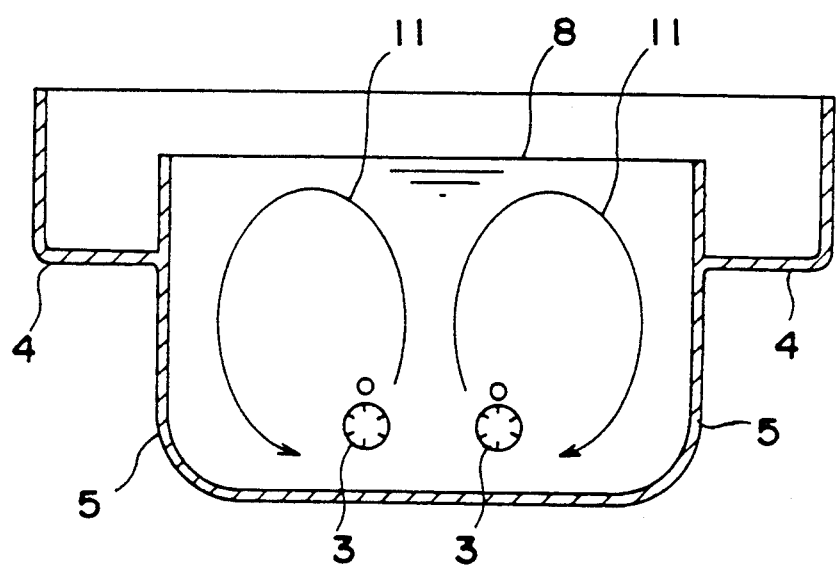

FIG. 15 shows in a sectional view a third modification of the present invention in which the cell is of rectangular cross section and two air bubble generating devices are disposed slightly biasedly from the axis of the cell and in symmetrical relationship with respect to a vertical plane passing the cell axis so that two spiral flows are formed which have rising flows at the center and downward flows along the cell walls. The third modification is advantageous especially when a large volume of the stock liquid is processed.

Figure 16:
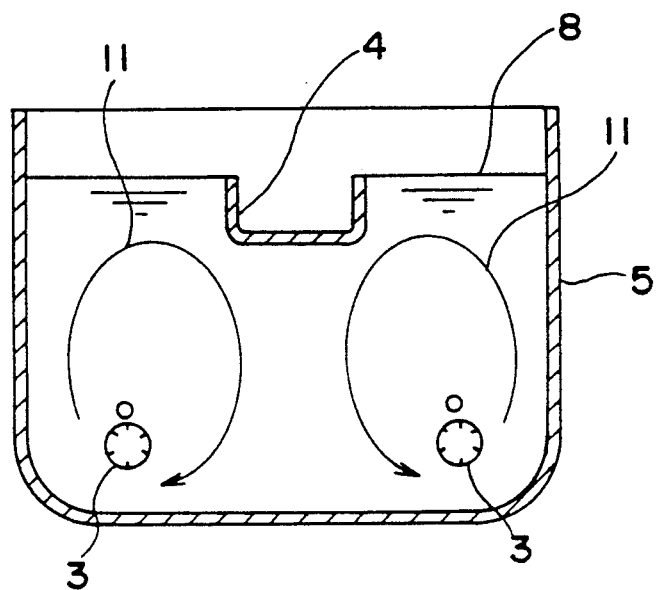

FIG. 16 shows a modification of the third modification shown in FIG. 15. Unlike the third modification, two air bubble generating devices are biased toward the side walls of the cell so that the down flows are formed between the devices and the upward flows are defined on the sides of the cell walls. Correspondingly, the froth trough is disposed at the center of the cell. It is also advantageous especially when the cell is large in size.

Figure 17:
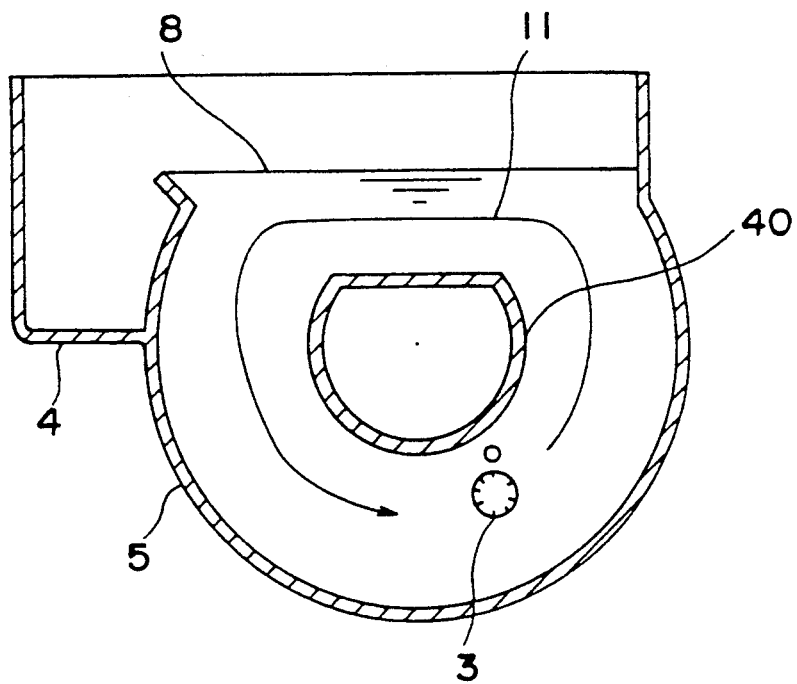

FIG. 17 shows a fourth modification in which a core 40 substantially analogous in shape to and smaller in size than the cell horizontally extends along the length of the cell in the vicinity of the axis of the spiral flow therein. Because of the core 40, the spiral flow positively passes through the air bubble generating device 3 so that mixture of the stock liquid with air bubbles can be much facilitated and dead zones liable to be produced in the vicinity of the axis of the spiral flow can be prevented.

Figure 18:
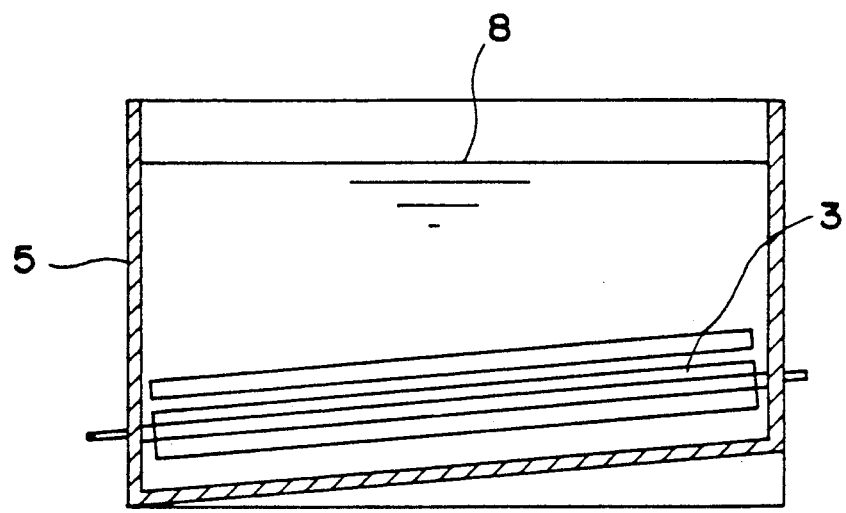

FIG. 18 shows in a transverse section a fifth modification of the present invention with the bottom of the cell being inclined. In this case, it is preferable to dispose the air bubble generating device in parallel with the inclined bottom. The inclined bottom is advantageous in that upon shutdown the stock liquid can be readily and completely discharged out of the cell so that the cleaning operation of the cell is much facilitated.

Figure 19:
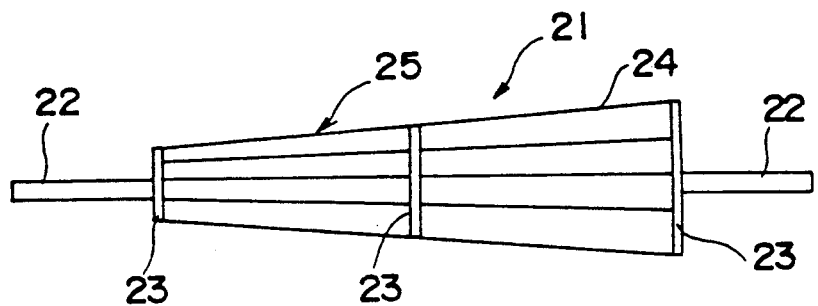
FIGS. 19–21 are views showing modifications of the turbine rotor of the flotation machine in accordance with the present invention.

FIG. 19 shows in a side view a first modification of the turbine rotor of the air bubble generating device. The rotor is frustoconical as shown. The diameter of the rotor adjacent to the stock liquid outlet is made larger to increase the peripheral speed of the outlet portion of the rotor to thereby make the air bubbles finer. As a result, the closer to the outlet, the greater the cleaning or purification effect becomes.

Figure 20:
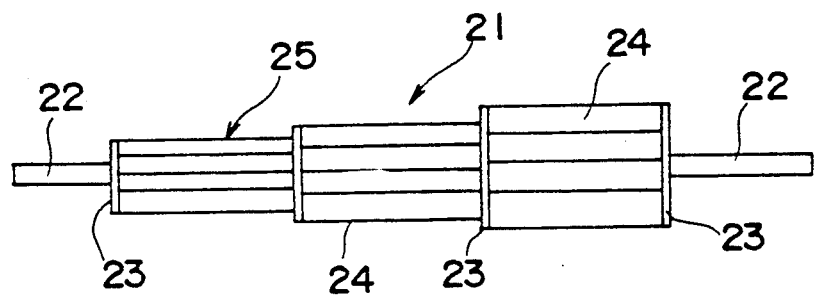

FIG. 20 shows a second modification of the turbine rotor in which the rotor is in the form of a telescopic barrel comprising a plurality of cylinders different in diameter and interconnected in the order of their diameters in coaxial relationship with each other. This modification can also attain the effects similar to that shown in FIG. 19.

Figure 21:
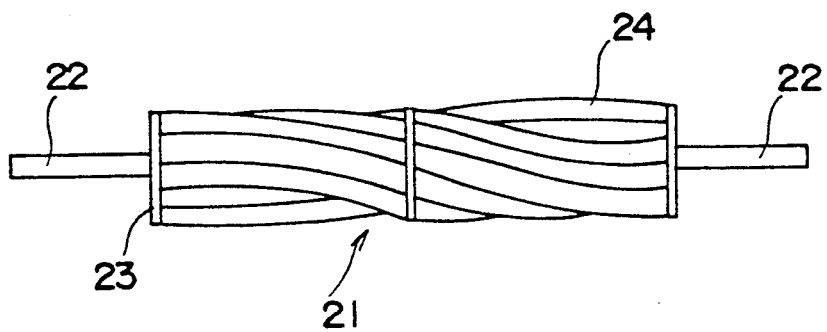

FIG. 21 shows a third modification of the turbine rotor in which the turbine blades are spirally twisted so that the spiral angle affords axial forces to the stock liquid. As a result, the spiral flow of the stock liquid can be controlled.

FIG. 22(a) shows a first modification of the turbine blade of the turbine rotor in which each blade is inclined at an angle with respect to the radial direction. Upon rotation of the rotor in the direction indicated by the arrow 70, the rotor can be driven by less force and the volume of the air bubbles processed is decreased accordingly. On the other hand, when the rotor is rotated in the direction indicated by the arrow 80, more force is needed for driving the rotor and the volume of air bubbles processed is increased.

FIG. 22(b) shows a second modification of the turbine blade in which each blade is in the form of arc. When the blade is rotated in the direction indicated by the arrow 70, the driving force required is decreased and the volume of air processed is reduced. On the other hand, when it is rotated in the direction indicated by the arrow 80, the driving force required is increased and the volume of air processed becomes greater.

FIG. 22(c) shows a third modification of the turbine blade in which each blade is in the form of a round rod so as to make the blade more readily fabricated to reduce production cost.

FIG. 23 shows a further modification of the turbine rotor. As shown, a core 29 substantially analogous in shape to and smaller in size than the outer wall of the turbine rotor is disposed within the rotor. Because of the core 29, which may cause any increase in production cost, advantageously the driving force can be decreased and the volume of air processed can be increased.

Figures 24A, 24B, 24C:
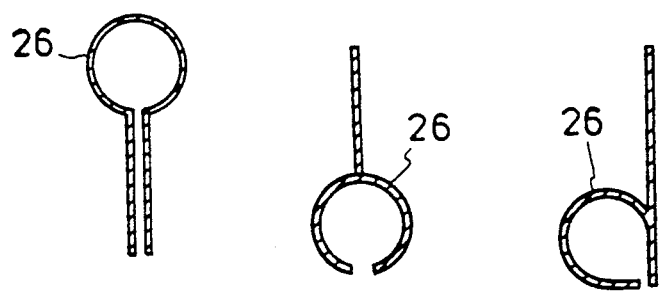
FIGS. 24(a), 24(b) and 24(c) are sectional views showing modifications of the air supply pipe of the flotation machine in accordance with the present invention.

FIGS. 24(a), 24(b) and 24(c) show various modifications of the air supply pipe 26 of the air bubble generating device. Each modification has a straight portion which intensifies conversion of the stock liquid flow moving in unison with the rotor into the upward flow.

Figure 2:
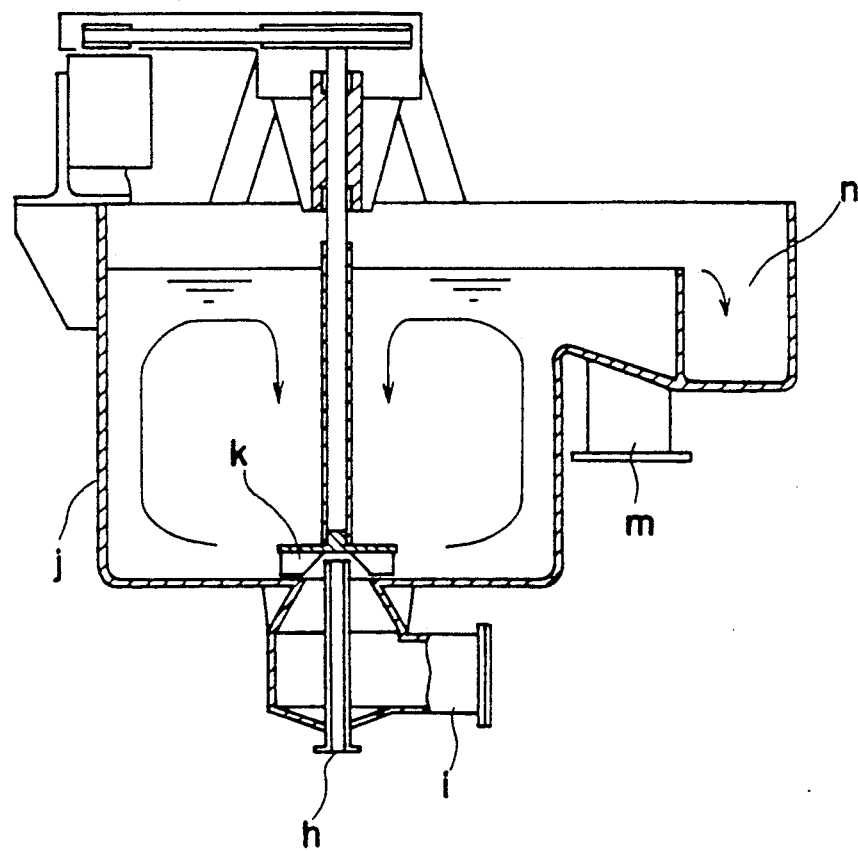
FIG. 2 is a sectional view of another former type flotation machine.
Figure 3:
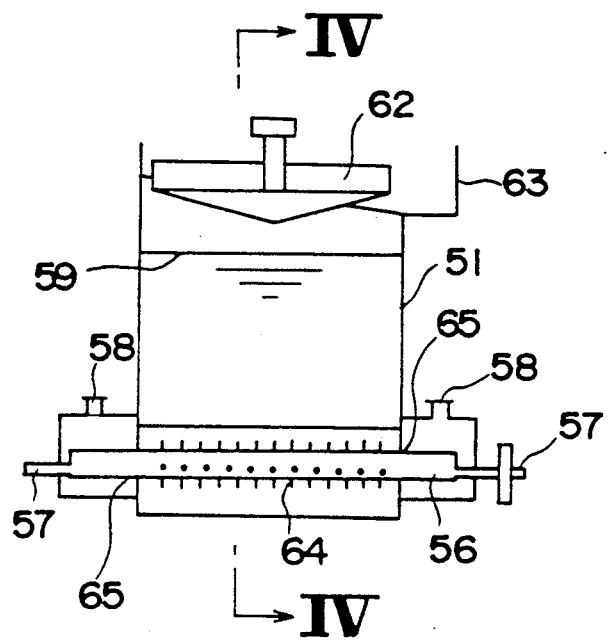
FIG. 3 is a sectional view of a recently developed flotation machine.
Figure 4:
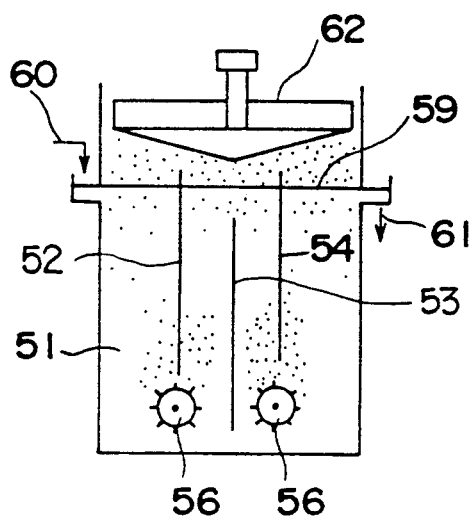
FIG. 4 is a sectional view taken along the line IV—IV of FIG. 3.
Figure 5:
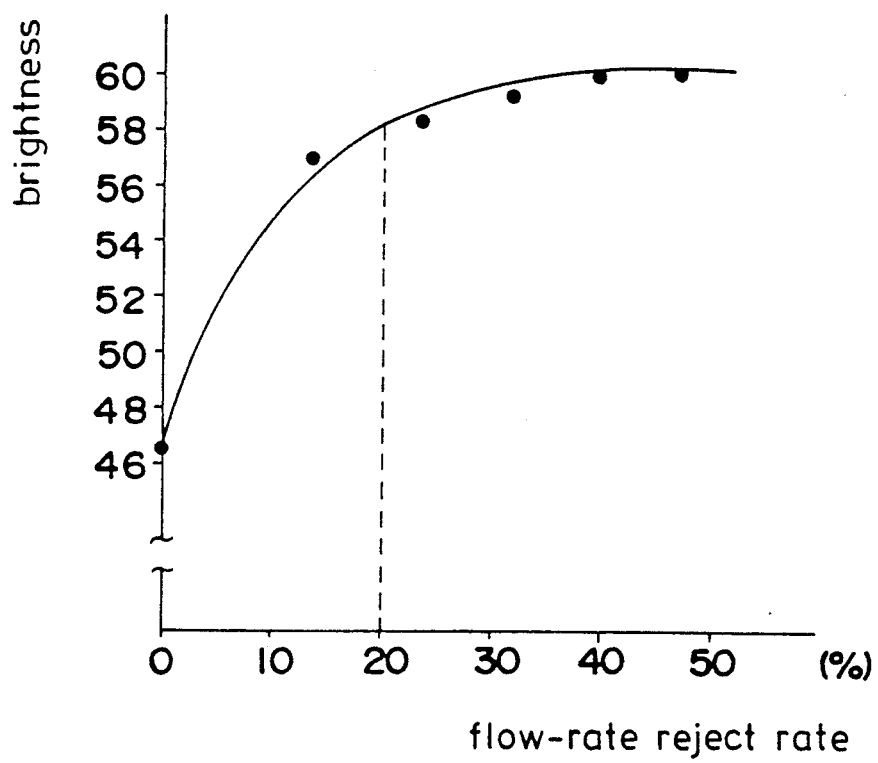
FIG. 5 is a graph illustrating the relationship between flow-rate reject rate and brightness.

It is to be understood that the flotation machine for deinking and some parts thereof in accordance with the present invention are not limited to the above-mentioned embodiments and modifications and that various further modifications may be made without leaving the true spirit of the present invention. For instance, when the claimed flotation machine is added with the rotary diffusion device as shown in FIG. 3, additional effects can be attained. In like manner, when the claimed air bubble generating device is incorporated in the conventional cell shown in FIG. 2, additional advantages can be obtained. One or more blades for scraping froth over the free surface of the liquid may be added.

Effects and advantages of the present invention may be summarized as follows:

I. Within the horizontally-disposed cylindrical barrel, the stock liquid flows between the inlet and outlet along the horizontal spiral path and, during the spiral flow, the liquid repeats the cycle that it first strikes on the air bubble generating device, flows upwardly, separates froth at the free surface of the liquid, flows downwardly and then strikes on the air bubble generating device again so that (1) fine air bubbles are uniformly and repeatedly admixed to the liquid, thereby eliminating useless blow of air and reducing the air blowing power required;
(2) the air bubbles admixed in the liquid facilitate agitation of the liquid, thereby requiring no specific power for agitation and reducing the power required for driving the air bubble generating device;
(3) no turbulence is caused in the liquid and no dead zone is formed in the cell, whereby the volume of the cell for processing a volume of stock liquid can be made less and any variation in brightness in the accept can be reduced to a minimum;
(4) repeated mixture and separation of the liquid and air bubbles shortens the processing time and decreases the volume of the cell for processing a volume of stock liquid; and
(5) no disturbance on the free surface of the liquid is caused and froth is uniformly generated, whereby froth floating over the free surface of the liquid is prevented from being entrapped by the liquid again and is smoothly removed.

II. As compared with the prior art with the air discharged out of the rotor, according to the present invention, the air supply pipe is disposed in the vicinity of the turbine rotor rotating at a high rotational speed so as to blow the air outside of the rotor into the rotor, thereby imparting extremely strong shearing forces to the air bubbles, so that (1) the air bubbles generated can be further reduced in size and can trap finer ink particles; and
(2) sealing means can be simple in construction and in maintenance and any clogging of an air port of the rotor due to the stock invading into the rotor can be prevented.

What is claimed is:

1. A flotation machine comprising a horizontally extending cell defining a horizontal axis, said cell having opposite ends and an open upper portion defining a stock liquid reservoir with a free surface at its top; horizontally oriented core means located substantially on the axis of the cell and extending along the length of the cell, said core means being substantially analogous in shape to the cell but smaller and defining an annular flow region between said core means and said cell, said cell further comprising a stock inlet for flowing the stock liquid into the annular flow region of the cell, a stock outlet for flowing the stock liquid out of the cell, and a froth overflow means for receiving froth from the free surface of the stock liquid; air bubble generating means comprising a horizontally extending turbine rotor rotatably mounted in said annular flow region and a horizontally extending air supply pipe means located adjacent said turbine rotor and within said annular flow region, said air supply pipe means having at least an air supply port opened toward the turbine rotor.

2. The means according to claim 1 wherein the turbine rotor is frustoconical.

3. The means according to claim 1 wherein the turbine rotor is telescopic with cylinders having different diameters arranged in the order of their sizes and coaxially with each other.

* * * * *